United States Patent Office 3,103,542
Patented Sept. 10, 1963

3,103,542
NATURAL RUBBER STABILIZED WITH ALKYL SUBSTITUTED HETEROCYCLIC COMPOUNDS
Richard James Fielden, Manchester, England, assignor to Imperial Chemical Industries Limited, London, England, a corporation of Great Britain
No Drawing. Filed Nov. 14, 1960, Ser. No. 68,695
Claims priority, application Great Britain Nov. 25, 1959
6 Claims. (Cl. 260—800)

This invention relates to the preservation of natural and synthetic rubbers, rubber articles and latices, polymers and mineral oils by the incorporation therein of certain alkyl substituted heterocyclic compounds.

Natural and synthetic rubbers and polymers are degraded by exposure to an atmosphere containing ozone with consequent impairment of properties. We have now found that incorporation into these materials of certain alkyl substituted heterocyclic compounds containing nitrogen affords a high degree of protection against attack by ozone.

Thus according to my invention I provide an improved process for the preservation of natural and synthetic rubbers, rubber articles and latices, polymers and mineral oils which comprises the incorporation therein of at least one alkyl substituted heterocyclic compound of the formula:

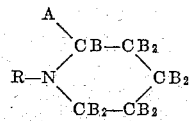

wherein R stands for an aryl group, A stands for an alkyl group, and each B stands for a hydrogen atom or an alkyl group.

As examples of aryl groups represented by R there may be mentioned the phenyl, α-naphthyl and β-naphthyl groups any of which may be substituted by groups such as alkyl, substituted alkyl, halogen, and alkyloxy. As examples of such aryl groups containing substituents there may be mentioned o-, m- and p-tolyl, 2:4-xylyl, 2:6-xylyl, o-, m-, and p-chlorophenyl, p-methoxyphenyl, p-ethoxyphenyl. If desired the aryl groups from two molecules of the alkyl substituted heterocyclic compounds may be linked through an alkylene, for example a methylene, group.

As examples of alkyl groups represented by A and each B there may be mentioned methyl, ethyl, n-propyl, isopropyl, sec.-butyl, n-heptyl, n-octyl. Alkyl groups containing not more than eight carbon atoms are preferred as furnishing the most effective antiozonants.

Those alkyl substituted heterocyclic compounds in which at least one B represents an alkyl group are particularly effective in conferring resistance to attack by ozone. As examples of such compounds there may be mentioned N-phenyl-2-propyl-3:5-diethylpiperidine, N-p-ethoxyphenyl-2-propyl-3:5-diethylpiperidine, N-p-tolyl-2-propyl-3:5-diethylpiperidine, N-(2':6'-dimethylphenyl)-2-propyl-3:5-diethylpiperidine, N-phenyl - 2 - ethyl-3:5-dimethylpiperidine, N-phenyl-2-octyl-3:5-diheptylpiperidine, N-phenyl-2-methyl-5-ethylpiperidine, bis-(2'-propyl-3':5'-diethylpiperidyl)diphenylmethane, and N-2'-naphthyl-2-propyl-3:5-diethylpiperidine.

Although some of the alkyl substituted heterocyclic compounds used in my invention are new compounds, compounds within the classes to which they belong have been previously described and the new compounds may be manufactured by the general methods already disclosed for their classes of compound.

For example the N-aryl-2-propyl-3:5-diethylpiperidines may be prepared by interaction of the appropriate substituted aniline with n-butyraldehyde followed by hydrogenation as has already been described for N-phenyl-2-propyl-3:5-diethylpiperidine. The corresponding N-phenyl-2-ethyl-3:5-dimethylpiperidine and N - phenyl-2-octyl-3:5-diheptylpiperidine may be prepared analogously using propionaldehyde and nonaldehyde respectively.

The alkyl substituted heterocyclic compounds may be incorporated into the rubber, rubber articles and latices, polymers or mineral oils according to the usual methods. Thus, for example, when used for preserving vulcanised rubber they may be mixed with the rubber along with vulcanising and other ingredients such as antioxidants, pigments, fillers, plasticisers and blowing agents, and the resulting mixes then cured by heat treatment, or they may be mixed with rubber along with other compounding ingredients and the mixture may be vulcanised by treatment with sulphur monochloride in the cold. The antiozonant effect of the alkyl substituted heterocyclic compounds in rubbers may be still further enhanced by the incorporation in addition of paraffin or microcrystalline waxes or mixtures thereof.

The alkyl substituted heterocyclic compounds are preferably used in proportions of from 0.25% to 5.0% of the weight of rubber or polymer, but larger or smaller proportions may be used if so desired. When used for preserving mineral oils the preferred proportions are from 0.001% to 2.0% of the weight of oil.

The synthetic rubbers which may be used include for example polymers of butadiene-1:3, isobutene, 2-methylbutadiene-1:3, and 2-chlorobutadiene-1:3, and copolymers of these compounds with each other or with acrylonitrile, styrene, methyl methacrylate and other well-known polymerisable compounds which are used in the manufacture of these rubbers. The polymers which may be used include for example polythene, polypropylene, polyvinyl chloride and polystyrene. The mineral oils which may be used include for example lubricating oils and motor fuels.

According to our invention I also provide new compositions of natural or synthetic rubbers, polymers or mineral oils characterised in that there is incorporated therein an alkyl substituted heterocyclic compound of the formula:

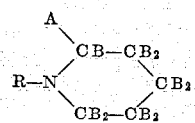

wherein R, A, and B have the same significances as before.

The rubber compositions may contain the rubber in any form, for example in massive, dispersed or fabricated form, and may be vulcanised or unvulcanised.

The alkyl substituted heterocyclic compounds used in the process of my invention possess extremely good antiozonant properties and in addition are non-staining. In this last property in particular they represent a considerable advance over previously disclosed antiozonants and they are of value in the preservation of rubber articles which are white, pale coloured or brightly coloured, in which cases discolouration on ageing is highly objectionable. They may also be used with advantage in rubbers or other polymeric materials which are in contact with such white, pale coloured or brightly coloured rubber in order to avoid migration of stain to these rubbers.

The invention is illustrated but not limited by the following examples in which the parts and percentages are by weight:

EXAMPLE 1

A mixture of 2 parts of Raney nickel and a solution of 26.6 parts of N-phenyl-2-propyl-3:5-diethyldihydropyridine (prepared by the method of Craig et al. Journal of the American Chemical Society, volume 70 (1948), page 1624) in 100 parts of ethanol is stirred at 50° C. under hydrogen at 100 atmospheres pressure. When absorption of hydrogen has ceased (about 10 hours) the mixture is cooled to 20° C., and the catalyst removed by filtration. The filtrate is evaporated to remove ethanol and the residue distilled under reduced pressure to give 23 parts of N-phenyl-2-propyl-3:5-diethylpiperidine, boiling from 114° to 116° C. at a pressure of 0.2 mm. of mercury.

EXAMPLE 2

137 parts of p-phenetidine are added over 30 minutes to a stirred mixture of 288 parts of n-butyraldehyde, 108 parts of water, and 8.7 parts of acetic acid at 10° C. The reaction mixture is then heated at the boil for 5 hours and then cooled to 15° C. The upper liquid layer is separated and distilled under reduced pressure to give firstly 60 parts of 2-ethyl-hexenal, boiling from 62° C. to 72° C. at a pressure of 12 mm. of mercury and then 150 parts of N-p-ethoxyphenyl-2-propyl-3:5-diethyldihydropyridine, boiling from 136° C. to 139° C. at a pressure of 0.3 mm. of mercury.

The procedure of Example 1 is repeated using 20 parts of N-p-ethoxyphenyl-2-propyl-3:5-diethyldihydropyridine instead of 26.6 parts of N-phenyl-2-propyl-3:5-diethyldihydropyridine. 18 parts of N-p-ethoxyphenyl-2-propyl-3:5-diethylpiperidine, boiling from 141° C. to 145° C. at a pressure of 0.3 mm. of mercury, $n_D^{26}$ 1.5210, are obtained.

EXAMPLE 3

The procedure of Example 2 is repeated using 107 parts of p-toluidine instead of 137 parts of p-phenetidine. 113 parts of N-p-tolyl-2-propyl-3:5-diethyldihydropyridine, boiling from 122° C. to 125° C. at a pressure of 0.3 mm. of mercury are obtained in the first stage. In the second stage 25 parts of N-p-tolyl-2-propyl-3:5-diethyldihydropyridine yield 22 parts of N-p-tolyl-2-propyl-3:5-diethylpiperidine, boiling from 122° C. to 124° C. at a pressure of 0.15 mm. of mercury, $n_D^{24}$ 1.5325.

EXAMPLE 4

To 300 parts of liquid ammonia are added in small amounts over 6 hours 17.3 parts of sodium metal. After reaction has ceased the excess of ammonia is allowed to distil off and to the residual sodamide are added 120 parts of 2-methyl-5-ethylpiperidine over 20 minutes followed by 52 parts of bromobenzene. The mixture is then heated with stirring to 120° C. for 2 hours followed by heating at 145° C. for 3 hours. After cooling to room temperature 5 parts of ethanol are added followed by the continuous addition of 100 parts of water. The oily layer is separated, and distilled to yield 44.4 parts of N-phenyl-2-methyl-5-ethylpiperidine boiling between 145° C. and 150° C. at a pressure of 15 mm. of mercury. Analysis shows this product to contain carbon 84.1%, hydrogen 8.7% and nitrogen 7.1%; $C_{14}H_{17}N$ requires carbon 84.3%, hydrogen 8.6% and nitrogen 7.03%.

EXAMPLE 5

25 parts of N-phenyl-2-octyl-3:5-diheptyldihydropyridine, prepared by the method of Craig et al. from aniline and nonaldehyde, are dissolved in 100 parts of methanol and to the solution is added 1 part of Raney nickel catalyst. The mixture is stirred at 50° C. under hydrogen at 100 atmospheres pressure until absorption of hydrogen ceases (about 10 hours). The catalyst is removed by filtration, the ethanol is distilled off and the residual oil is distilled under reduced pressure to yield 17 parts of N-phenyl-2-octyl-3:5-diheptylpiperidine boiling at 173° C. under a pressure of 0.3 mm. of mercury.

EXAMPLE 6

25 parts of N-(4'-chlorophenyl)-3-propyl-3:5-diethyldihydropyridine are reduced by hydrogen in the presence of Raney nickel in a similar manner to the preceding example to give 14 parts of N-(4'-chlorophenyl)-2-propyl-3:5-diethylpiperidine boiling between 128° C. and 133° C. at a pressure of 0.4 mm. of mercury.

EXAMPLE 7

71.5 parts of β-naphthylamine are added gradually over 1 hour to a stirred mixture of 144 parts of n-butyraldehyde, 4.3 parts of acetic acid and 54 parts of water at 10° C. and the mixture is then heated to the boiling point for 16 hours. After cooling the oil layer is separated and distilled under reduced pressure. There is obtained 118 parts of 2-ethylhexenal boiling between 62° C. and 75° C. at a pressure of 14 mm. of mercury, small amounts of oil boiling from 84° C. to 230° C. under a pressure of 14 mm. of mercury, and 33 parts of a crystalline residue melting between 109° C. and 113° C. which consists chiefly of N-(2'-naphthyl)-2-propyl-3:5-diethyldihydropyridine. This product is reduced with hydrogen using Raney nickel as catalyst in an analogous manner to that of Example 1 and yields 30 parts of a viscous oil consisting substantially of N-(2'-naphthyl)-2-propyl-3:5-diethylpiperidine, shown by analysis to contain nitrogen 5.0%; $C_{22}H_{31}N$ requires 4.6%.

EXAMPLE 8

A mixture of 30 parts of water, 0.1 part of sulphuric acid, 0.1 part of sulphanilic acid, 4.0 parts of 40% aqueous formaldehyde and 26 parts of N-phenyl-2-propyl-3:5-diethylpiperidine is heated with stirring for 11 hours at a temperature between 70 and 75° C. After cooling the liquid is extracted with ether, the ether layer is separated, and the ether distilled off to give 26 parts of an oily residue which consists chiefly of a mixture of 2:2'-, 2:4'- and 4:4'-bis(2''-propyl-3'':5''-diethylpiperidyl)-diphenylmethane.

EXAMPLE 9

Rubber mixes of the following composition are made up:

| | Parts |
|---|---|
| Pale crepe natural rubber | 100 |
| Stearic acid | 1 |
| Zinc oxide | 25 |
| Titanium dioxide | 50 |
| Calcium carbonate | 15 |
| Mercaptobenzthiazole | 0.6 |
| Sulphur | 2.5 |
| Antiozonant, as indicated below. | |

Mix A contains no antiozonant and the other mixes contain 2 parts of antiozonant as follows: B, N-phenyl-2 - propyl - 3:5 - diethylpiperidine; C, 4 - isopropylaminodiphenylamine; D, N - (4' - ethoxyphenyl) - 2-propyl - 3:5 - diethylpiperidine; E, N - (4' - methylphenyl) - 2 - propyl - 3:5 - diethylpiperidine; F, N-phenyl - 2 - methyl - 5 - ethylpiperidine; G, N - phenyl-2-octyl-3:5-diheptylpiperidine; and H, N-(4'-chlorophenyl-2-propyl-3:5-diethylpiperidine. These mixes are cured for 17.5 minutes at 153° C., and test strips of the vulcanisates are exposed to air containing 0.2 p.p.m. of ozone.

The appearance of these strips after exposure is detailed in Table 1 and shows that the alkyl substituted heterocyclic compounds are markedly effective in conferring resistance to ozone and additionally have the advantage over the commercial antiozonant, 4-isopropylaminodiphenylamine, of not producing stain on exposure to light.

Table I

| Mix | Ozone exposure | | Stain after exposure to U.V. light |
|---|---|---|---|
| | 52 hours | 91 hours | |
| A | Deep cracks over whole area. | Very deep cracks over whole area. | Pale cream. |
| B | Slight cracks at edges. | Cracks at edges, slight cracks over remainder. | Do. |
| C | ___do___ | Slight cracks at edges, very slight cracks over remainder. | Deep brown. |
| D | ___do___ | as B | Pale cream. |
| E | ___do___ | as B | Do. |
| F | Slight cracks over whole area. | Moderate cracks over whole area. | Do. |
| G | Slight cracks at edges. | ___do___ | Do. |
| H | ___do___ | as B | Do. |

Test strips of vulcanisates A, B and C are also subjected to outdoor flexing. The times of flexing required for these test strips to reach equivalent levels of cracking are recorded in Table II and demonstrate that N-phenyl-2-propyl-3:5-diethylpiperidine and 4-isopropyl-aminodiphenylamine confer similar ozone resistance under outdoor conditions.

Table II

Mix:         Time for onset of cracks (hours)
A ———————————————————— 5
B ———————————————————— 25
C ———————————————————— 21

EXAMPLE 10

Rubber mixes of the following compositions are made up:

| | Mix J | Mix K |
|---|---|---|
| Pale crepe natural rubber | 100 | 100 |
| Zinc oxide | 25 | 25 |
| Titanium dioxide | 50 | 50 |
| Winnofil | 15 | 15 |
| Stearic acid | 1 | 1 |
| Sulphur | 2.5 | 2.5 |
| Mercaptobenzthiazole | 0.6 | 0.6 |
| N-phenyl-2-propyl-3:5-diethylpiperidineformaldehyde reaction product prepared as described in Example 8 | ——— | 2 |

These mixes are cured at 153° C. for 18 minutes and test strips of each vulcanised mix are exposed to air containing 0.2 part per million of ozone. The times taken for these test strips to attain similar levels of cracking are shown in Table III. These times demonstrate that a N-phenyl-2-propyl-3:5-diethylpiperidine formaldehyde reaction product provides valuable protection against ozone attack.

Table III

| Mix | Time to reach equivalent level of cracking (hours) | |
|---|---|---|
| | Static | Dynamic |
| J | 23 | 45 |
| K | 47 | 78 |

What I claim is:

1. An improved composition of matter comprising natural rubber and, in an amount of 0.001 to 5.0% thereof by weight, at least one alkyl substituted heterocyclic compound of the formula

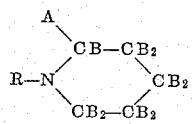

wherein R stands for an aryl group, A stands for a lower alkyl group and each B stands for a member of the group consisting of hydrogen atoms and lower alkyl groups.

2. A composition of matter as set forth in claim 1 wherein the lower alkyl groups which may be represented by B contain not more than 8 carbon atoms.

3. A composition of matter as claimed in claim 1 wherein at least one B represents a lower alkyl group.

4. A composition of matter as claimed in claim 1 in which the alkyl substituted heterocyclic compound is an N-aryl-2:3:5-trialkylpiperidine.

5. A composition of matter as claimed in claim 1 wherein the alkyl substituted heterocyclic compound is N-phenyl-2-propyl-3:5-diethylpiperidine.

6. A composition of matter as claimed in claim 1 wherein the alkyl substituted heterocyclic compound is a reaction product of N-phenyl-2-propyl-3:5-diethylpiperidine and formaldehyde.

References Cited in the file of this patent

UNITED STATES PATENTS

| 1,779,390 | Clifford | Oct. 21, 1930 |
| 2,198,961 | Dietrich | Apr. 30, 1940 |
| 2,955,083 | Levin | Oct. 4, 1960 |

FOREIGN PATENTS

| 886,040 | France | June 21, 1943 |
| 570,569 | Canada | Feb. 10, 1959 |
| 204,038 | Austria | June 25, 1959 |